June 7, 1927.
H. R. COLLINS
1,631,119
PULVERIZED FUEL FEEDER
Filed March 2, 1922
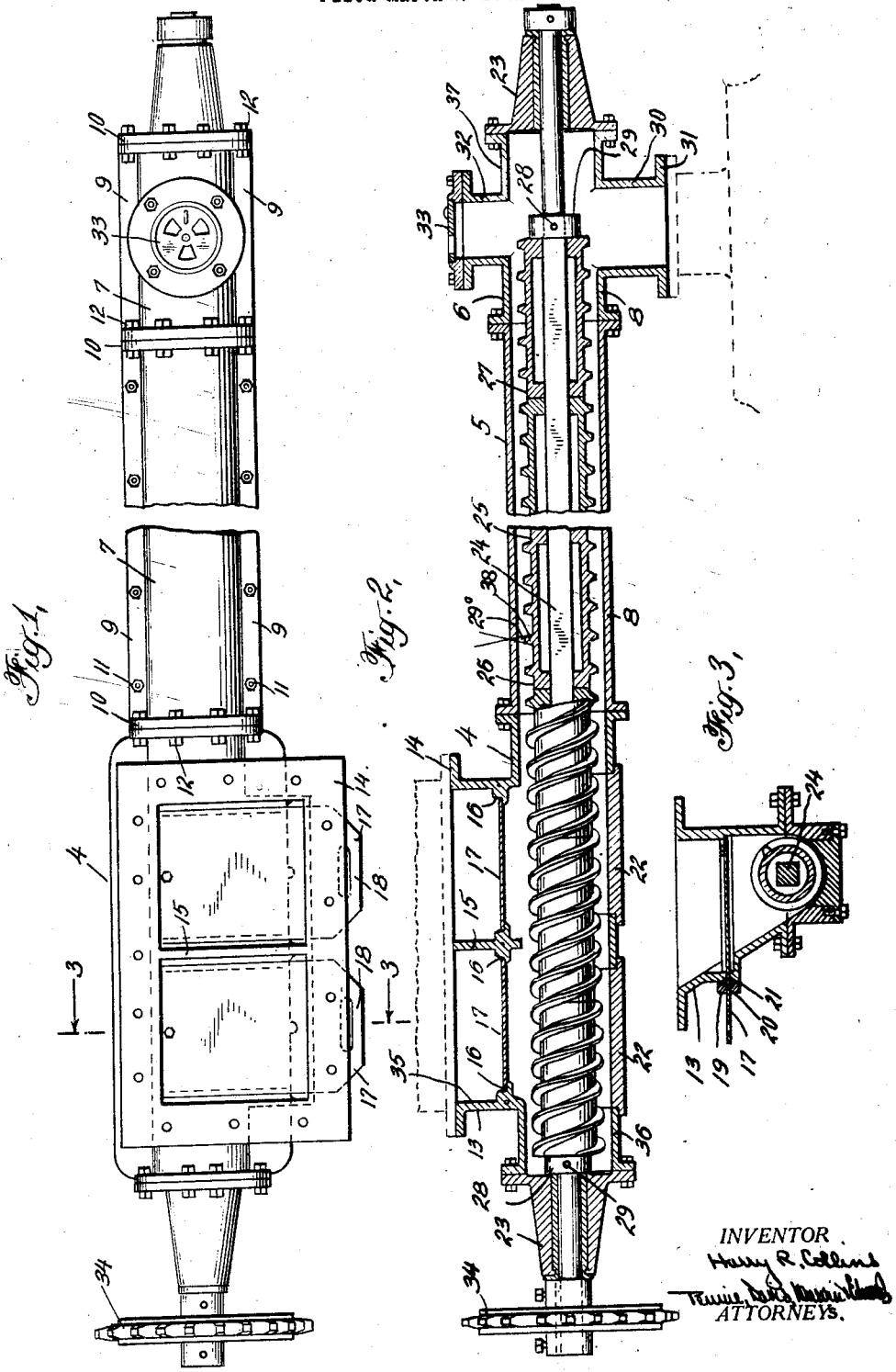
INVENTOR
Harry R. Collins
ATTORNEYS.

Patented June 7, 1927.

1,631,119

UNITED STATES PATENT OFFICE.

HARRY RAYMOND COLLINS, OF ALLENTOWN, PENNSYLVANIA, ASSIGNOR TO FULLER-LEHIGH COMPANY, A CORPORATION OF PENNSYLVANIA.

PULVERIZED-FUEL FEEDER.

Application filed March 2, 1922. Serial No. 540,641.

This invention relates to a feeder for pulverized fuel and involves the provision of a feeder of this type which is adapted more particularly for carrying fuel from a supply bin and feeding it to a burner for injecting a mixture of fuel and air into the combustion chamber of a furnace.

Burners of the type indicated usually comprise a casing or housing into which the fuel is introduced through a fuel inlet, as by gravity from a bin to which the inlet is connected, and a feed screw which is mounted to operate within the casing for carrying fuel to a discharge outlet emptying into the fuel inlet of the burner.

In accordance with one feature of the invention, the casing of the feeder is composed of a plurality of sections, one of the sections preferably being a main section provided with an inlet for fuel to the casing, and the remainder of the sections being made up of plate units joined together to form sections which are interconnected and connected to the main section. The sections and the plate units composing them are secured together in a manner such that they may be readily and quickly removed one from the other for cleaning, inspecting and repairing different parts of the casing and the feed screw therein. The plate units in one form of construction are made to form upper and lower halves which are longitudinally and transversely flanged and secured together as by means of bolts passing through the flanges. Thus by removing the lower plates of each section, the entire feed screw may be inspected.

In addition to having the casing in sections for the purposes indicated, the feed screw within the casing is also preferably composed of unit sections. With the feed screw, as well as the casing, composed of an assembly of unit sections, a construction results which makes possible quick disassembling or dismantling at different points along or throughout the whole casing. Furthermore, there results the important advantage that the feeder may be readily and quickly lengthened or shortened by the addition or removal of casing and screw sections to make the overall length of the feeder conform to the space available for its accomodation in a given installation.

The casing preferably has, as before stated, a main section to which additional built-up sections are joined in accordance with the length of feeder desired, and the main section is provided with an inlet for fuel to the casing. In the fuel inlet are means, such as one or more slides operating in guide grooves, for controlling the admission of fuel to the casing. By such means the flow of fuel may be completely shut off when it is desired to shorten or lengthen the casing by the removal or addition of casing sections, without disconnection of the casing from the bin. In order to prevent the escape of fuel through the guide grooves on which the slides or other fuel control means are mounted, a packing clamp is provided which preferably consists of a member having slots therein for receiving the slides, and a depression or cutaway portion on its inner surface that forms, with a corresponding depression in the wall of the fuel inlet, an opening or groove for receiving packing which is arranged to bear upon the slides and form a tight joint, thus precluding the escape of particles of fuel form the inlet. The main section is conveniently also provided with a pair of cleanout covers for the removal of obstructive accumulations of fuel in this section of the casing.

The shaft supporting the screw sections is mounted in bearings at each end of the casing, the latter being provided with a discharge outlet for the fuel in addition to the usual fuel inlet, and the shaft has means thereon whereby it may be connected to power to rotate the feed screw so that the thrust of the screw will be in a direction from the fuel inlet to the discharge outlet for fuel at the end of the casing. The fuel inlet in the main casing section is, in the preferred arrangement, constructed to form a housing for the screw which extends a distance from the fuel inlet opening in a direction opposite to the direction of the screw thrust, which prevents the entry of fuel into the bearings of the screw shaft at the inlet end of the casing.

Near the discharge outlet of the casing is an inlet for air which is induced into the casing for admixture with the fuel by the action of the burner to which the feeder is connected, and this air inlet consists, for example, of an air port situated at the top of the casing in a position over the discharge opening, the size of the port being controlled by a butterfly valve.

The sections forming the screw feed are preferably provided with a double thread, the threads being arranged on the sections so that when the latter are assembled in position on the screw shaft they will form a continuous double helical screw. Continued movement of fuel in the casing and through the discharge outlet after the rotation of the feed screw is stopped, which action is commonly known as "flooding" or "flushing" of the fuel, is prevented, it has been found, by providing a double screw as decribed, the thread of which has an angle approximating 29° and the pitch of which is made in accordance with the size of the feeder.

Other features of the invention will be brought out in the following description of the preferred form of the invention in connection with the accompanying drawings, in which—

Fig. 1 is a plan view of the feeder;

Fig. 2 is a longitudinal section of the feeder shown in Fig. 1; and

Fig. 3 is a section along the line 3—3 of Fig. 1.

Referring to the drawings, the casing of the feeder is made up of a main section 4 and a plurality of sections 5 and 6 added thereon. The sections 5 and 6 each consists of a top plate unit 7 and a similar bottom plate unit 8 each of the plate units being provided with longitudinal flanges 9 and transverse flanges 10 which are joined together to form casing sections 5 and 6. The upper and lower halves of the casing sections 5 and 6, consisting of the plate units 7 and 8, are joined together by means of bolts 11 passing through the longitudinal flanges 9, and the sections 5 and 6 are joined together and to the main section 4 of the casing by means of bolts 12 passing through the transverse flanges 10.

The main section 4 is provided with an inlet or hopper 13 through which fuel is fed to the feeder casing from the discharge outlet of a feed device to which the inlet 13 is adapted to be connected by means of the flange 14. The fuel inlet is divided into two compartments by the partition wall 15, and this wall, together with the walls of the fuel inlet proper, are provided with guides or grooves 16 in which are mounted a pair of slides 17 for controlling the admission of fuel to the casing through the fuel inlet. These slides are provided with hand grips 18 so that they may be conveniently opened and closed. Secured to the front wall of the fuel inlet or hopper 13 is a packing clamp 19 having slots 20 therein through which the slides 17 pass. The inner face of the packing clamp and the front wall of the fuel inlet opposite the clamp are cut out to provide a V-shaped recess for holding the packing 21 which bears against the slides 17 and prevents the escape of the fuel from the fuel inlet through the guides or grooves 16 on which the slides are mounted. The main casing 4 is further provided with cleanout covers 22 which may be opened for the removal of obstructive accumulations of fuel therein.

At each end of the casing is a bearing 23, and mounted in these bearings and extending through the casing is a shaft 24 which is square in form as shown in Fig. 3 although it will be understood that this shaft may be of any multisided form. Mounted on the shaft 24 is a feed screw 25 which consists of a number of similar hollow screw sections such as the sections 26 and 27 which are provided with screw threads so arranged that when the sections are assembled on the shaft 24 they will join to form a continuous double helical screw. The screw sections are held on the shaft 24 between a pair of collars 28 and the collars are fixed to the shaft by means of cotter pins 29.

At the end of the casing opposite the inlet end is a discharge outlet 30 for fuel which is adapted to be connected to the inlet opening of a burner by means of the flange 31. Situated at the top of the casing opposite the discharge outlet 30 is an air inlet 32 which is provided with a butterfly valve 33 for regulating the amount of air which is introduced into the feeder casing by the action of the burner to which it is attached. The screw shaft is provided at its end adjacent the fuel inlet with a sprocket wheel 34 which is adapted to be connected, as by means of a chain, to a source of power for driving the feeder.

The driving connection with the sprocket 34 is arranged, of course, so that the thrust of the feed screw will be in a direction to carry the fuel from the inlet 13 to the discharge outlet 30. The casing of the inlet 13 is extended at 36 beyond the inlet opening 35 in a direction opposite to the direction of thrust of the feed screw, and toward the left bearing 23, to provide a casing or housing 36. The purpose of this extension 36 of the inlet is to prevent the fuel entering the casing through the fuel inlet from accumulating about the bearing 23 and forcing its way into the bearing and causing injury thereto. The fuel, as it drops through the inlet 13, is engaged by the second or third screw thread from the end of the shaft and is thus carried forward through the casing without any appreciable amount of fuel finding its way into the extension housing 36 and so the bearing at this end of the casing is protected against the entry of particles of fuel. The casing is also provided with an extension 37 which projects beyond the discharge outlet 30, and the feed screw terminates at a point approximately on the axial line of the discharge opening. By this construction the bearing for the screw shaft at this end of the casing is protected against the entry of fuel particles.

In screw feeding devices of the type described, there is a tendency for the fuel in the casing of the feeder to continue flowing toward and out of the discharge outlet of the feeder after the rotation of the screw has been stopped. This action is known as "flooding" or "flushing" of the fuel, and is of course objectionable since, when the rotation of the feed screw is stopped, it is desirable that the feeding of fuel to the burner should also be brought to an abrupt stop as near as that may be accomplished. It has been found that the "flooding" or "flushing" action of the fuel in the casing may be greatly reduced or even eliminated by making the feed screw a double threaded helical screw as has been pointed out and making the angle of the sides of the threads about 29° as indicated at 38, the pitch of the thread being varied in accordance with the size of the feeder.

I claim:

1. A feeder for pulverized fuel and the like comprising a main section having an inlet, a plurality of auxiliary cylindrical sections connected end to end to form a casing connected at one end to the main section, each auxiliary section being made up of plate members connected to each other along their adjacent lateral edges to complete the section and provided at their ends with means by which adjacent sections may be connected together, a feed screw extending through the casing and the main section, and means outside the casing for connecting the feed screw to a source of power.

2. A feeder for pulverized fuel and the like comprising a main section, a plurality of auxiliary cylindrical sections connected end to end to form a casing connected at one end to the main section, each auxiliary section being made up of top and bottom plate members connected together along their adjacent lateral edges to complete the section and provided at their ends with means by which adjacent sections may be connected together, a feed screw extending through the casing, and means outside the casing for connecting the feed screw to a source of power.

3. A feeder for pulverized fuel, including a main section and an assembly of plate units forming additional sections which are joined together and to the main section to form a casing, the plate units composing said sections consisting of top and bottom plates having longitudinal and transverse flanges by which the plates and sections formed thereby are joined together, a shaft extending through the casing, a plurality of screw sections mounted on the shaft comprising a feed screw within the casing, and means for connecting the shaft to a source of power, substantially as described.

4. A feeder for pulverized fuel and the like, comprising the combination of a main section, a plurality of auxiliary cylindrical sections connected end to end to form a casing connected at one end to the main section, each auxiliary section being made up of plate members secured together along their adjacent lateral edges to complete the section and provided at their ends with means by which adjacent sections may be connected together, a shaft extending through the main section and the casing, and a plurality of cylindrical screw sections, each having end walls through which the shaft extends and by which the sections are keyed to the shaft, the end walls of adjacent sections lying in contact, a double screw thread being formed on said screw sections, this double thread extending from one end of the main section to the opposite end of the casing, a driving connection for the shaft outside the casing and the main section, an inlet for admitting material to the main section to be advanced to the casing by the screw, and an outlet for material in one of the plate members forming the auxiliary section remote from the main section.

In testimony whereof I affix my signature.

HARRY RAYMOND COLLINS.